UNITED STATES PATENT OFFICE.

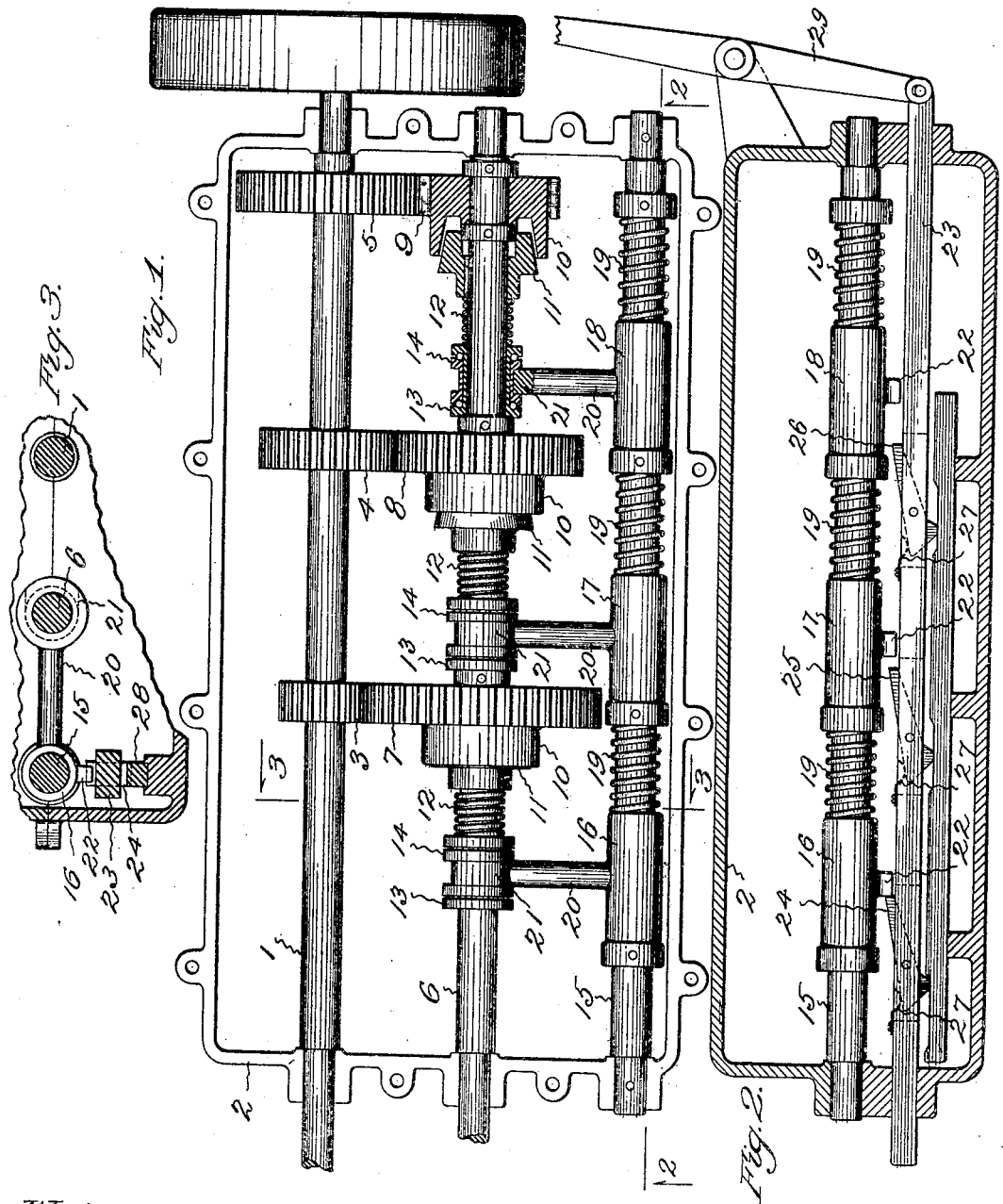

MORTON C. TALCOTT, OF HARTFORD, CONNECTICUT.

VARIABLE-SPEED GEAR.

No. 809,406.  Specification of Letters Patent.  Patented Jan. 9, 1906.

Application filed October 14, 1905. Serial No. 282,791.

*To all whom it may concern:*

Be it known that I, MORTON C. TALCOTT, a citizen of the United States, residing at Hartford, in the county of Hartford and State of Connecticut, have invented a new and useful Variable-Speed Gear, of which the following is a specification.

This invention relates to a mechanism for changing the speed of a transmission-shaft without changing the speed of the motor-shaft or unmeshing any of the gears by a simple movement of a lever.

The object of the invention is to provide a compact, strong, and sure gearing which can be operated to obtain the several speeds by a straight movement of a single lever.

In the gearing illustrated gears of different diameters are keyed to the motor-shaft, and meshing with these are gears of different diameters that are loose on the transmission-shaft. The loose gears are arranged to be connected with the transmission-shaft by friction-clutches which are actuated to cause connection by forks on the ends of arms projecting from sleeves on a fixed shaft, which sleeves are moved in one direction by springs and in the opposite direction by dogs carried by a bar that is reciprocated by the lever. When the lever is moved forward, a dog engages one sleeve, and then another dog engages another sleeve, and finally another dog engages the other sleeve, the several dogs being disengaged at the proper time by means of fixed wedges.

Figure 1 of the accompanying drawings shows a plan of a gearing that embodies the invention with the upper portion of the case omitted and one of the clutches cut in section in order to illustrate its construction. Fig. 2 shows a vertical section through the case, taken on the plane indicated by 2 2 on Fig. 1. Fig. 3 shows a transverse section of a portion of the gearing, taken on the plane indicated by 3 3 on Fig. 1.

The motor-shaft 1 is of common design, is supported in a suitable case 2 in the usual way, and may be connected with the engine in any manner. Keyed to the motor-shaft of the form of gearing illustrated are gears 3, 4, and 5 of different diameters. Loose on the transmission-shaft 6 are gears 7, 8, and 9 of different diameters. The gears keyed to the motor-shaft and loose on the transmission-shaft are always in mesh.

The hub 10 of each of the gears loose on the transmission-shaft is provided with a tapering recess, so as to form a female clutch part, and splined on the transmission-shaft, so as to move into and out of each female clutch part, is a conical male clutch part 11. Springs 12 are arranged on the transmission-shaft between the male clutch parts and sleeves 13, that are movable along the transmission-shaft. On these sleeves are collars 14, with ball-bearings arranged between the collars and the sleeves to reduce the friction.

On a fixed shaft 15, arranged parallel with the transmission-shaft, are sleeves 16, 17, and 18. These sleeves are preferably thrust in one direction by springs 19. Extending outwardly from each of these sleeves is an arm 20, on the outer end of which is a fork 21, which embraces a collar 14. Extending downwardly from each sleeve on the fixed shaft is a lug 22. Below and parallel with the fixed shaft is a bar 23. Pivoted to this bar in line with the lugs depending from the sleeves are dogs 24, 25, and 26. Each of these dogs has its rear end depressed by a spring 27 into engagement with the wedge-bar 28 that is fixed beneath the dog-bar.

Attached to the front end of the bar which carries the dogs is a lever 29. This lever may be moved directly by the hand or foot of an operator or may be connected with a hand or foot lever at any desired locality. When this lever is oscillated so as to draw the dog-bar forwardly, the dog 24 engages a lug and pushes the sleeve 16 forwardly. This causes the first clutch to connect the gear 7 with the transmission-shaft. When this is connected, the motor-shaft drives the transmission-shaft slowly. If the dog-bar is moved forwardly another stage, the rear end of the first dog engages an incline on the wedge-bar and is raised so that its front end is disengaged from the lug projecting from the sleeve 16, allowing that sleeve to spring back and the clutch to release the gear 7 from the transmission-shaft. The continued forward movement of the bar then causes the dog 25 to engage the lug projecting from the sleeve 17 and move this sleeve so that the second clutch will connect the gear 8 with the transmission-shaft. When this gear is connected, the motor-shaft drives the transmission-shaft somewhat faster than previously. Further movement of the dog-bar causes the dog 25 to be oscillated and disengaged from the lug on the sleeve 17, releasing the clutch that connects the gear 8, and causes the dog 26 to engage the lug which projects from the sleeve 18. The movement of this sleeve causes the third clutch to connect the gear 9 with the transmission-shaft. When this gear is connected, the motor-shaft drives the transmission-shaft at a much greater speed than previously. With this construction by a simple movement of the lever in one direction the first dog causes a clutch to connect the low-speed gear, then the second dog causes a clutch to connect the intermediate-speed gear, and finally a third dog will cause a clutch to connect the high-speed gear.

The invention claimed is—

1. A gearing having a motor-shaft, gears of different diameters on the motor-shaft, a transmission-shaft, gears of different diameters on the transmission-shaft and meshing with the gears on the motor-shaft, the gears on one shaft being keyed and the gears on the other shaft being loose, clutches adapted to connect the loose gears with their shaft, a reciprocatory bar, dogs carried by the bar and adapted when moved in one direction to cause the closing of the clutches successively, and a wedge-bar arranged to cause a disengagement of the dogs and allow the clutches to successively release, substantially as specified.

2. A gearing having a motor-shaft, gears of different diameters keyed on the motor-shaft, a transmission-shaft, gears of different diameters loose on the transmission-shaft and meshing with the gears on the motor-shaft, clutches adapted to connect the loose gears with the transmission-shaft, a reciprocatory bar, dogs carried by the bar and adapted when moved in one direction to cause the closing of the clutches successively, and a wedge-bar arranged to cause a disengagement of the dogs and allow the clutches to successively release, substantially as specified.

3. A gearing having a motor-shaft, gears of different diameters keyed on the motor-shaft, a transmission-shaft, gears of different diameters loose on the transmission-shaft and meshing with the gears on the motor-shaft, clutches adapted to connect the loose gears with the transmission-shaft, a fixed shaft, sleeves movable on the fixed shaft and adapted to move the clutches, a reciprocatory bar, dogs carried by the bar and adapted when moved in one direction to successively engage and move the sleeves, and a wedge-bar arranged to cause a successive disengagement of the dogs from the sleeves, substantially as specified.

4. A gearing having a motor-shaft, gears of different diameters keyed on the motor-shaft, a transmission-shaft, gears of different diameters loose on the transmission-shaft and meshing with the gears on the motor-shaft, clutches adapted to connect the loose gears with the transmission-shaft, a fixed shaft, sleeves movable on the fixed shaft, arms projecting from the sleeves and arranged to move the clutches, a reciprocatory bar, dogs carried by the bar and adapted when moved in one direction to successively engage and move the sleeves, and a wedge-bar arranged to cause a successive disengagement of the dogs from the sleeves, substantially as specified.

5. A gearing having a motor-shaft, gears of different diameters keyed on the motor-shaft, a transmission-shaft, gears of different diameters loose on the transmission-shaft and meshing with the gears on the motor-shaft, clutches adapted to connect the loose gears with the transmission-shaft, sleeves on the transmission-shaft, springs between the sleeves and the clutches, collars on the sleeves, antifriction-bearings between the collars and the sleeves, a fixed shaft, sleeves movable on the fixed shaft, arms extending outwardly from the sleeves on the fixed shaft, forks connected with the arms and engaging the collars on the sleeves on the transmission-shaft, a reciprocatory bar, dogs carried by the bar and adapted when moved in one direction to successively engage and move the sleeves, and a wedge-bar arranged to cause a successive disengagement of the dogs from the sleeves, substantially as specified.

MORTON C. TALCOTT.

Witnesses:
HARRY R. WILLIAMS,
ETHEL M. LOWE.